United States Patent [19]

Farkas

[11] Patent Number: 5,369,687
[45] Date of Patent: Nov. 29, 1994

[54] APPARATUS FOR ELECTRICALLY ISOLATING A TELEPHONE LINE FROM A DATA DEVICE

[75] Inventor: Steven E. Farkas, Sherman Oaks, Calif.

[73] Assignee: Practical Peripherals, Inc., Thousand Oaks, Calif.

[21] Appl. No.: 991,999

[22] Filed: Dec. 17, 1992

[51] Int. Cl.$^5$ .......................................... H04M 11/00
[52] U.S. Cl. ...................................... 379/98; 379/93; 375/8
[58] Field of Search .................. 375/8; 379/98, 96, 97, 379/93, 94

[56] References Cited

U.S. PATENT DOCUMENTS

| | | |
|---|---|---|
| 4,373,117 | 2/1983 | Pierce . |
| 4,395,590 | 7/1983 | Pierce et al. . |
| 4,417,099 | 11/1983 | Pierce . |
| 4,500,754 | 2/1985 | Mackey . |
| 4,578,533 | 3/1986 | Pierce . |
| 4,592,069 | 5/1986 | Reeding . |
| 5,086,454 | 2/1992 | Hirzel ..................................... 375/8 |
| 5,224,154 | 6/1993 | Aldridge et al. ........................ 375/8 |

Primary Examiner—Curtis Kuntz
Assistant Examiner—Stella L. Woo
Attorney, Agent, or Firm—Jones & Askew

[57] ABSTRACT

A data access arrangement circuit (60) for supplying electrical isolation between a telephone line (11) and a data device, such as a data terminal or a computer, connected to a modem (10). An isolation circuit (17) connected between a first modem circuit (15) having a transmitter (19), a receiver (20), and a controller (18), and a second modem circuit (16) connected to the telephone line (11), couples signals between the first modem circuit (15) and the second modem circuit (16), thereby electrically isolating the first modem circuit (15) from the second modem circuit (16). The second modem circuit (16) conditions an incoming analog telephone signal received via the telephone line (11) to supply an incoming digital data signal to the receiver (20). The second modem circuit (16) further conditions an outgoing digital data signal received from the transmitter (19) to supply an outgoing analog telephone signal for transmission over the telephone line (11). The isolation circuit (17) couples the incoming data signal, the outgoing data signal, and control signals between the second modem circuit (16) and the first modem circuit (15) while electrically isolating the second modem circuit (16) from the first modem circuit (15) A first power source (21) supplies operating power to the first modem circuit (15) and a second power source (22) draws power only from the telephone line (11) to supply operating power to the second modem circuit (16). Electrical isolation between the first modem circuit (15) and the second modem circuit (16) is maintained by the use of these separate power sources.

21 Claims, 3 Drawing Sheets

APPARATUS FOR ELECTRICALLY ISOLATING A TELEPHONE LINE FROM A DATA DEVICE

TECHNICAL FIELD

The present invention relates to modems for coupling data between a telephone line and a data device and, more particularly, to a modem which electrically isolates the telephone line from a data device without using an isolation transformer.

BACKGROUND OF THE INVENTION

The Federal Communications Commission (FCC) has issued a stringent set of regulations and specifications that must be satisfied by equipment intended for connection to a telephone line to prevent such equipment from degrading the operation of the network. This equipment, such as a modem, must satisfy these regulations and specifications before the equipment is connected to the telephone network. Generally, some form of electrical isolation circuitry is required to prevent voltage transients or surges generated by the equipment from reaching the telephone line and thereby degrading telephone network operation. Further, the connected equipment must not provide a path from the telephone line to ground.

The use of a transformer within a modem to electrically isolate the telephone line is well known. Typically, a directly coupled or capacitively coupled isolation transformer is connected between the two wire telephone line and the analog front end of the modem circuit to provide the necessary electrical isolation.

Although a transformer supplies a high degree of electrical isolation, the transformer is also one of the physically largest and heaviest electrical components in a typical modem circuit. The placement of the transformer on a modem printed circuit board having limited board layout space is a challenging design task because the transformer is much larger than the other electrical components of the remaining modem circuitry. Furthermore, the overall weight of a modem is typically significantly increased by the use of the isolation transformer in a modem design. Consequently, the physical size and weight of the modem, as well as the appearance of the packaging or housing for a modem, is often constrained by the physical characteristics of the isolation transformer.

A modem is often utilized with a portable computer system for communicating data between a remote site and a central computer location. Portable personal computers, such as laptop and notebook personal computers, are of small size and low weight and generally require peripheral devices of proportional small size and low weight. The portability of a laptop or a notebook computer is limited if a necessary peripheral device, such as a modem, is of significant size or weight when compared with the computer. Therefore, the users of such small size portable computers require a reduced sized modem package that is thinner and lighter than modems intended for use with larger personal computers employed in a stationary location, such as desktop personal computers.

The Personal Computer Memory Card International Association (PCMCIA) has established an industry standard for connecting a peripheral device to a small sized personal computer, such as a laptop or a notebook computer. To date, the small sized modems compatible with this industry standard, often described as thin modems, utilize an external "plug-in" or outboard isolation transformer to supply the proper voltage levels to the modem and to electrically isolate the telephone line from the computer. The transformer, which connects to a power outlet during modem operation, is physically separated from the remaining modem circuitry by a cable, thereby enabling the thin modem to be conveniently installed within or adjacent to the housing of the small sized computer. However, the portability of a small sized computer connected to a thin modem having an external isolation transformer remains limited by the bulky size and weight of the outboard transformer.

To reduce the size and weight of the isolation transformer, it is well known to provide one signal path for coupling certain telephone line signals, such as incoming ringing signals, to the modem circuitry and another signal path which couples the data signals to the modem circuitry via a capacitively coupled isolation transformer. This capacitive coupling design enables the use of a smaller and lighter isolation transformer by preventing saturation of the small core of the transformer. Nevertheless, a transformer is still required by this prior art design to provide the necessary isolation between the telephone line and the modem circuitry.

Alternative prior art modems utilize electro-optical isolators to isolate the telephone line from the data device. Electro-optical isolators typically employ an emitter, such as a light emitting diode (LED), which supplies a light signal in response to an input electrical signal, and a photodetector that supplies a corresponding electrical output signal in response to the the received light signal. The use of electro-optical isolators for electrically isolating an input circuit from an output circuit is well known.

U.S. Pat. Nos. 4,373,117, 4,417,099, and 4,578,533, all to Pierce, and U.S. Pat. No. 4,395,590 to Pierce et al. describe a line powered modem that derives its operating power entirely from the telephone line and uses electro-optical isolators within receiver and transmitter data buffers located between the telephone line and an RS-232 serial interface to electrically isolate the telephone line. However, the Pierce line powered modem also includes a DC-to-DC converter that utilizes a two-winding transformer to supply the proper voltage levels for the RS-232 interface and to provide additional electrical isolation between the telephone line.

U.S. Pat. No. 4,592,069 to Redding describes a line powered modem that obtains its entire operating power from the telephone line and uses an electro-optical isolator located at each of the data input terminals and the data output terminals of the modem. The electro-optical isolators electrically isolate the terminals from the remaining modem circuitry to provide the required isolation for the telephone line. The Redding line powered modem further uses an inductance simulation circuit to prevent the power supply from loading down the AC signal on the telephone line, thereby assisting the construction of the modem circuit as a single integrated circuit. However, the power consumption of the Redding line powered modem is limited because the modem does not have a power source separate from the telephone line and FCC regulations limit the amount of power that can be drawn from the telephone line. Also, the Redding modem is a relatively simple modem having only a frequency shift keying (FSK) mode and does not support other high level or advanced communications modes, such as phase shift keying (PSK) or PSK combined with pulse amplitude modulation (PAM).

Therefore, there is a need for a small sized, advanced modem that has sufficient power capability to support high level communications modes and does not use a transformer for electrically isolating the telephone line from the data device. The present invention uses electro-optical isolators for coupling signals between a first modem circuit including a transmitter, a receiver and a controller, and a second modem circuit connected to the telephone line, thereby electrically isolating the telephone line. Electro-optical isolator devices, which are typically packaged within a dual in-line package, are sufficiently small to allow the construction of a thin modem. The present invention further uses separate power sources to power the first and second modem circuits, thereby supplying the necessary power to support advanced communications modes, and to maintain the electrical isolation provided by the electro-optical isolator devices connected between these modem circuits.

SUMMARY OF THE INVENTION

The principles of the present invention solve the problem of electrically isolating the telephone line without using an isolation transformer in a modem. In particular, the present invention enables the packaging of a modem within a smaller sized housing than would be employed for a modem which uses a transformer for electrical isolation. Furthermore, a modem constructed in accordance with the present invention is sufficiently small and light weight to be compatible for use with a portable computer, such as a laptop or notebook computer.

Briefly summarized, the present invention has an isolation circuit connected between a first modem circuit and a second modem circuit to couple signals between the first modem circuit and the second modem circuit and to thereby electrically isolate the first modem circuit from the second modem circuit. The first modem circuit comprises a transmitter, a receiver, and a controller and the second modem circuit is connected to a telephone line.

The second modem circuit converts (encodes) an incoming analog telephone signal received via the telephone line to an incoming digital data signal which is provided to the receiver. Furthermore, the second modem circuit converts (decodes) an outgoing digital data signal supplied by the transmitter to send an outgoing analog telephone signal over the telephone line.

The isolation circuit couples the incoming digital data signal, the outgoing digital data signal, and certain control signals between the second modem circuit and the first modem circuit to insure that the telephone line is electrically isolated from a data device, such as a data terminal or a computer, connected to the first modem circuit. Electrical isolation is further maintained between the first modem circuit and the second modem circuit because a first power source supplies operating power to the first modem circuit and a second power source draws power directly from the telephone line to supply operating power to the second modem circuit.

More particularly described, the present invention uses electro-optical isolators connected between the first modem circuit and the second modem circuit to couple signals between these modem circuits and thereby electrically isolate the first modem circuit from the second modem circuit.

Specifically, the second modem circuit, typically implemented by a coder/decoder (CODEC), converts (encodes) the incoming analog telephone signal into an incoming digital data signal and then supplies this incoming digital data signal to the receiver via a first electro-optical isolator device. The first electro-optical isolator device electrically isolates the receiver from the second modem circuit. The receiver then operates upon the incoming digital data signal and sends a received data signal to the data device for processing by the device. CODECs are well known for use in digital-to-analog and analog-to-digital conversion processes.

In response to a transmit data signal supplied by the data device to the transmitter, the transmitter sends an outgoing digital data signal via a second electro-optical isolator device to the second modem circuit. The second electro-optical isolator device electrically isolates the transmitter from the second modem circuit. The second modem circuit sends an outgoing analog telephone signal via the telephone line by converting (decoding) the outgoing digital data signal and generating a modulated outgoing audio frequency signal for transmission over the telephone line.

A third electro-optical isolator device, representing a pair of isolators, operates to electrically isolate the controller from the second modem circuit by coupling the control signals from the controller to the second modem circuit.

Thus, the first modem circuit is electrically isolated from the second modem circuit. Specifically, the first, second, and third electro-optical isolator devices operate to electrically isolate the second modem circuit from the first modem circuit. In this manner, the telephone line is electrically isolated from the data device connected to the first modem circuit, thereby isolating the data device or the modem from the telephone line.

The first power source supplies operating power to the transmitter, the receiver, and the controller. The second power source supplies operating power to the second modem circuit by drawing power only from the telephone line. In contrast, the first power source is powered from a source other than the telephone line. The use of separate power supplies to power the first modem circuit and the second modem circuit further operates to electrically isolate the second modem circuit from the first modem circuit and, thus, isolate the telephone line from the data device.

In addition to the aspects described above, the present invention also provides a data access arrangement circuit for electrically isolating the telephone line from a data device connected to a modem. The data access arrangement circuit provides a standard telephone line interface for the digital modem circuit, such as the first modem circuit. The data access arrangement circuit includes a second modem circuit coupled to the telephone line and to the first modem circuit for conditioning (decoding and encoding) signals supplied by the telephone line and the first modem circuit. An isolation circuit connected between the second modem circuit and the first modem circuit electrically isolates the second modem circuit from the first modem circuit. A second power source supplies operating power to the second modem circuit by drawing power only from the telephone line.

Therefore, it is an object of the present invention to provide an apparatus, such as a modem, for electrically isolating a telephone line from a data device.

It is a further object of the present invention to provide an apparatus, such as a modem, for electrically isolating a telephone line from a data device without the use of an isolation transformer.

It is a further object of the present invention to provide an apparatus, such as a modem, for electrically isolating a telephone line from a data device connected to an advanced modem capable of high level communications modes.

It is a further object of the present invention to provide an apparatus, such as a modem, for electrically isolating a telephone line from a data device by using electro-optical isolator devices to couple signals between a first modem circuit and a second modem circuit and using separate power sources to supply the operating power for the first modem circuit and the second modem circuit.

DETAILED DESCRIPTION

Figure 1A:
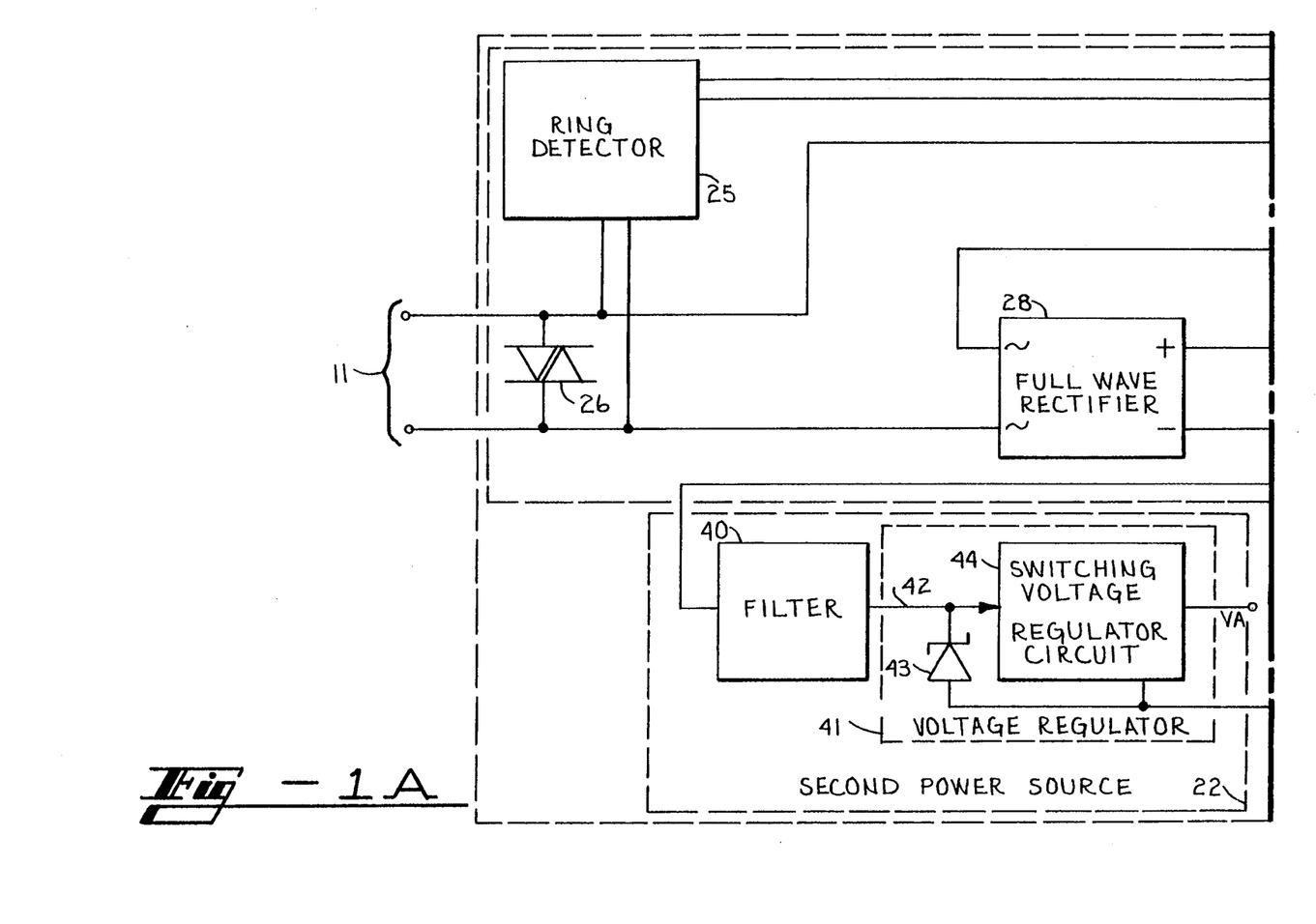
FIGS. 1A and 1B are a block diagram of the preferred embodiment of the present invention.
Figure 1B:
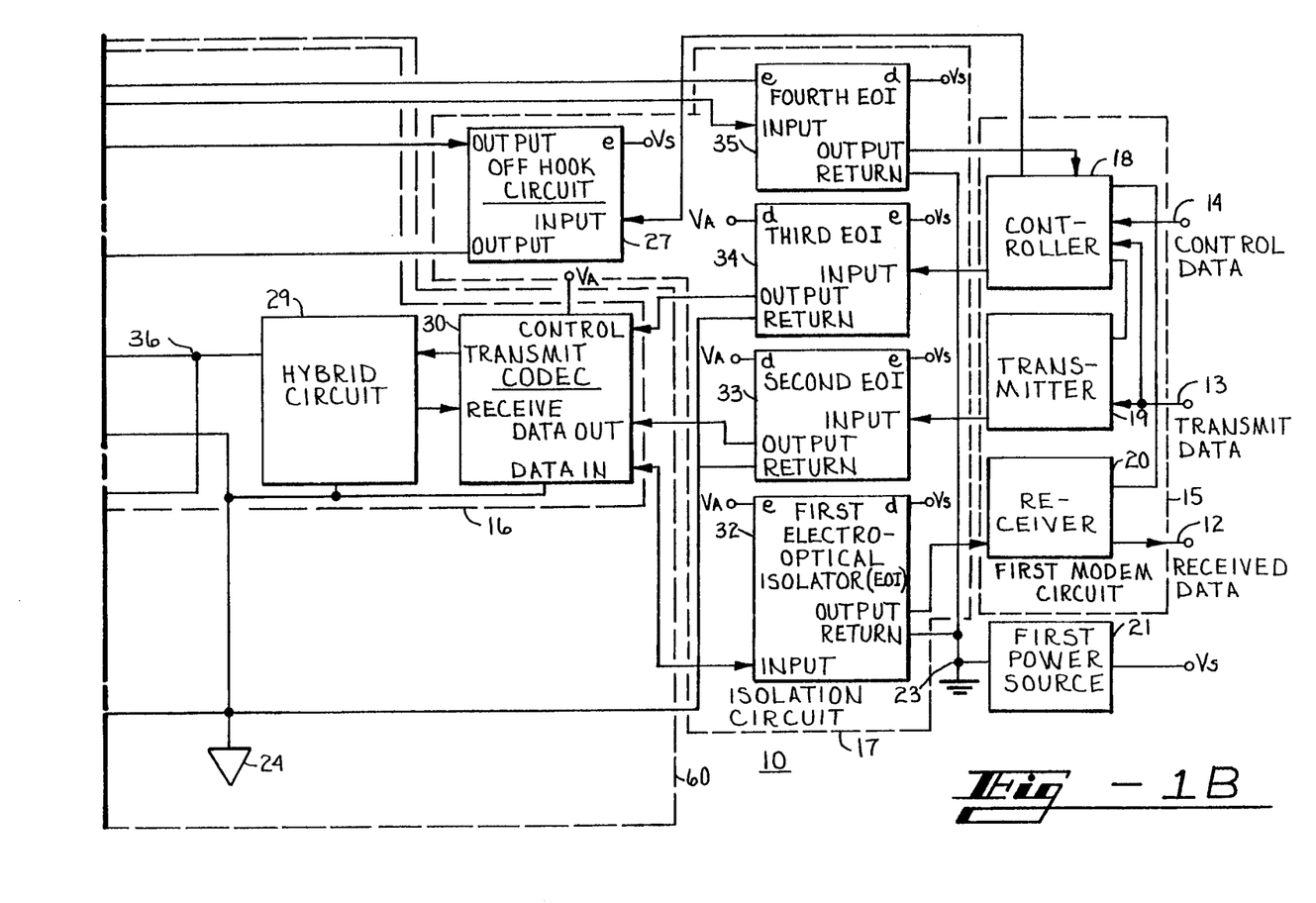

Turn now to the drawing, in which like numerals represent like components throughout the several figures. FIGS. 1A and 1B are a block diagram of the preferred embodiment of the present invention, a modem 10. The modem 10 is designed to accommodate data transfers between a telephone line 11 and an external data device (not shown) such as a data terminal or a computer. The modem 10 conditions an incoming analog telephone signal received via the telephone line 11 to provide received data to the data device via a signal path 12. The modem 10 receives transmit data from the data device via a signal path 13 and operates upon the transmit data to generate an outgoing analog telephone signal suitable for transmission over the telephone line 11. The modem 10 also receives control data from the data device via a control signal path 14 and conducts data transfer operations in response to the control data. For the preferred embodiment, the modem 10 is an advanced modem capable of operating in a selected communications mode, including FSK and various high level communications modes, such as PSK and PSK/PAM.

The modem 10 comprises a first modem circuit 15 connected to the data device via the signal paths 12, 13 and 14, a second modem circuit 16 connected to the telephone line 11, and an isolation circuit 17 connected between the first modem circuit 15 and the second modem circuit 16. The second modem circuit 16 conditions (encodes) input signals supplied by the telephone line 11 and conditions (decodes) input signals supplied by the first modem circuit 15 and produces output signals to, respectively, the first modem circuit 15 and the telephone line 11. The isolation circuit 17 couples signals between the first modem circuit 15 and the second modem circuit 16 and, furthermore, electrically isolates the first modem circuit 15 from the second modem circuit 16. Therefore, even though the first modem circuit 15 is connected to the data device and the second modem circuit 16 is connected to the telephone line 11, the telephone line 11 is electrically isolated from the data device because of isolation circuit 17.

The modem 10 further comprises separate power sources: a first power source 21 and a second power source 22. The first power source 21 supplies operating power to the first modem circuit 15 by outputting an operating voltage $V_S$. For the preferred embodiment, the first power source 21 does not draw power from the telephone line 11 to supply the operating voltage $V_S$. The operating voltage $V_S$ is preferably a fixed DC voltage level of $+5$ volts. The first power source 21 is connected to a first modem circuit return/ground 23, which provides the ground reference for the first modem circuit 15.

The second power source 22, which is described in more detail below, is coupled to the telephone line 11 to draw power from the telephone line. The second power source 22 supplies regulated power to the second modem circuit 16 by outputting a regulated DC operating voltage $V_A$. The second power source 22 is connected to a second modem circuit return/ground 24, which supplies the ground reference for the second modem circuit 16. It should be noted that ground references 20 and 23 are electrically isolated from each other.

Accordingly, the first modem circuit 15 receives operating power from a power source that is separate from the source that powers the second modem circuit 16. Thus, electrical isolation is maintained between the first modem circuit 15 and the second modem circuit 16 by the combined use of separate power sources 21 and 22, and the isolation circuit 17.

The first modem circuit 15 includes a controller 18, a transmitter 19, and a receiver 20. The controller 18, also referred to as a control means, is connected to the second modem circuit 16 via the isolation circuit 17, to the transmitter 19 and to the receiver 20, and to the data device via the control signal path 14, and controls the data transfer operations of the modem 10. For the preferred embodiment, the controller 18 sends a pair of control signals, a frame synchronization signal and a clock signal, to the second modem circuit 16 to control the transfer of data to and from circuit 16. Furthermore, the controller 18 supplies transmitter control signals to the transmitter 19 and receiver control signals to the receiver 20 to control modem transmitter and modem receiver operations.

In response to transmitter control signals from the controller 18, the transmitter 19 operates upon transmit data received from the data device via the signal path 13. In particular, the transmitter 19 performs data compression, data encoding, protocol, format and error control operations upon the transmit data and supplies an outgoing digital data signal to the second modem circuit 16. Likewise, in response to receiver control signals from the controller 18, the receiver 20 performs data decoding/recovery operations, data decompression, data detection, and error detection upon an incoming digital data signal supplied by the second modem circuit 16. Upon completion of these receiver operations, the receiver 20 sends received data via the signal path 12 to the data device. Construction and operation of a modem controller, a modem transmitter, and a modem receiver, such as, respectively, the controller 18, the transmitter 19, and the receiver 20, are, in general, well known, and the modifications thereto required by the present invention are apparent from the description herein.

The second modem circuit 16 comprises a ring detector 25, otherwise referred to as a ring detection means, a surge protection device 26, a full wave rectifier 28, otherwise referred to as a rectifying means, a hybrid circuit 29, and a coder/decoder (CODEC) 30. In response to control signals from the controller 18, the second modem circuit 16 converts (encodes) an incoming analog telephone signal received via the telephone line 11 to supply an incoming digital data signal to the receiver 20. In addition, the second modem circuit 16 converts (decodes) an outgoing digital data signal supplied by the transmitter 19 to produce an outgoing analog telephone signal for transmission via the telephone line 11 in response to control signals from the controller 18. The incoming digital data signal, the outgoing digital data signal, and the control signals are coupled between the second modem circuit 16 and, respectively, the receiver 20, the transmitter 19, and the controller 18 via the isolation circuit 17 to electrically isolate the second modem circuit 16 from the first modem circuit 15.

The ring detector 25 is connected to the telephone line 11 and, upon the occurrence of a telephone ring event, the ring detector 25 supplies a ring detection signal to the controller 18 via the isolation circuit 17. If the controller 18 has been instructed by the data device to answer incoming calls, then the controller 18 supplies an off hook control signal to an off hook circuit 27, which is connected between the telephone line 11 and the full wave rectifier 28. The off hook circuit 27 thereafter operates to connect the telephone line 11 to the remaining circuitry of the modem 10. For the preferred embodiment, the off hook circuit 27 connects one line, such as the ring line, of the telephone line 11 to the full wave rectifier 28 in response to the off hook control signal, thereby completing the connection of the telephone line 11 to the remaining modem circuitry.

The surge protection device 26, coupled between the ring and tip lines of the telephone line 11, prevents high level voltage transients or surges from entering the modem 10 via the telephone line 11. For the preferred embodiment, the surge protection device 26 is a varistor.

The full wave rectifier 28 is connected between the off hook circuit 27 and the hybrid circuit 29 and rectifies the signal on telephone line 11 to provide a rectified telephone line signal between junction 36 and the second modem circuit return/ground 24. The rectified telephone line signal is provided to the second power source 22 and to the hybrid circuit 29. In addition, the full wave rectifier 28 operates to pass the outgoing analog telephone signal from hybrid circuit 29 for transmission by the telephone line 11.

The hybrid circuit 29 is connected to the full wave rectifier 28 and to a Receive data input and a Transmit data output of the CODEC 30. The hybrid circuit 29 operates to separate the incoming analog telephone signal from the outgoing analog telephone signal and to place the outgoing telephone signal onto the telephone line 11.

The CODEC 30 is connected between the isolation circuit 17 and the hybrid circuit 29. The CODEC 30 produces the incoming digital data signal by encoding the incoming analog telephone signal from hybrid circuit 29. The CODEC 30 thereafter outputs the encoded incoming digital data signal to the receiver 20 via the isolation circuit 17. The CODEC 30 produces the outgoing analog telephone signal by decoding the outgoing digital data signal supplied by the transmitter 19 via the isolation circuit 17. The CODEC 30 thereafter outputs the decoded outgoing analog telephone signal to the full wave rectifier 28 via the hybrid circuit 29 for transmission over the telephone line 11.

The construction and operation of the ring detector circuit 25, the off hook circuit 27, the full wave rectifier 28, and a modem hybrid circuit, such as the hybrid circuit 29, are well known. The CODEC 30 is preferably a high precision pulse code modulation (PCM) CODEC, model T7525, manufactured by American Telephone & Telegraph (AT&T) Microelectronics, Allentown, Pa.

The ring detector 25, which monitors the ring and the tip lines, detects the voltage levels associated with a telephone ring event for an incoming telephone signal and outputs the ring detection signal to the controller 18 via a fourth electro-optical isolator device 35. If the controller 18 has been instructed to answer incoming calls, the controller 18 sends the off hook detection signal to the off hook circuit 27 in response to the ring detection signal, and the off hook circuit 27 thereafter connects the telephone line 11 to the remaining circuitry of the modem 10 by connecting the telephone line 11 to the full wave rectifier 28.

The isolation circuit 17, also referred to as an isolation means, includes the off hook circuit 27, a first electro-optical isolator (EOI) device 32, a second electro-optical isolator device 33, a third electro-optical isolator device 34, and the fourth electro-optical isolator device 35. The first electro-optical isolator device 32 couples the incoming digital data signal from the second modem circuit 16 to the receiver 20. The transmitter 19 outputs the outgoing digital data signal to the second modem circuit 16 via the second electro-optical isolator device 33. Similarly, the controller 18 outputs the pair of control signals, the frame synchronization signal and the clock signal, to the second modem circuit 16 via the third electro-optical isolator device 34. The fourth electro-optical isolator device 35 couples the ring detection signal to the controller 18. Each of the electro-optical isolator devices 32, 33, 34, and 35 operates to couple a particular signal between modem circuits 15 and 16 while electrically isolating the first modem circuit 15 from the second modem circuit 16.

The off hook circuit 27 is preferably an electro-optical relay device for connecting the telephone line 11 to the full wave rectifier 28 in response to the control signal supplied by the controller 18. The preferred off hook circuit 27 is a model LH1056AT high voltage solid state relay manufactured by AT&T Microelectronics in Allentown, Pa. The model LH1056AT relay includes an input control LED and a normally open output relay. In response to the control signal, the input control LED optically couples an internal control signal to the output relay, thereby closing the relay and supplying a signal path between the telephone line 11 and the full wave rectifier 28. Accordingly, the off hook circuit 27 also operates to electrically isolate the first modem circuit from the second modem circuit.

For the preferred embodiment, the electro-optical isolator devices 32, 33, and 35 are single optical coupler devices for supplying an output signal corresponding to an input signal and thereby isolating the input of the device from the output of the device. In contrast, the third electro-optical isolator device 34 represents two independent optical coupler devices that accept a pair of input signals and supply a pair of corresponding output signals.

During data reception operation, the hybrid circuit 29, which is coupled between the full wave rectifier 28 and the CODEC 30, outputs the incoming analog telephone signal to the Receive port of the CODEC 30. The CODEC 30 converts the incoming analog telephone signal into a digital data signal by performing encoding operations in response to control signals from the controller 18. Upon the conclusion of an encoding operation, a Data In port of the CODEC 30 outputs the incoming digital data signal to the receiver 20 via the first electro-optical isolator device 32. The receiver 20 performs well-known data processing and error detection/correction operations upon the incoming digital data signal and thereafter outputs received data to the data device via the signal path 12.

For data transmission operation, the data device sends transmit data to the controller 18 and the transmitter 19 via the signal path 13. In response to the transmit data, the controller 18 enables the transmitting operations of the transmitter 19, such as data compression, data encoding, format, protocol, and error control operations. In turn, the transmitter 19 outputs the outgoing digital data signal to a Data Out input port of the CODEC 30 via the second electro-optical isolator device 33.

The CODEC 30 conditions (decodes) the outgoing digital data signal by providing an analog outgoing telephone signal in response to the outgoing digital data signal and to the control signals received at the Control Port input port of the CODEC 30. The CODEC 30 then outputs an outgoing analog telephone signal via a Transmit port of the CODEC 30 to the hybrid circuit 29 for transmission over the telephone line 11. The hybrid circuit 29 sends the outgoing analog telephone signal, via the full wave rectifier 28 and the off hook circuit 27, by increasing and decreasing (modulating) the line current drawn from telephone line 11. Thus, the hybrid circuit 29, the full wave rectifier 28, and the off hook circuit 27 provide the outgoing analog telephone signal to the telephone line 11 to effect the transmission of the outgoing analog telephone signal.

Still referring to FIGS. 1A and 1B, the second power source 22, connected to the positive port of the full wave rectifier 28 via a signal path 37, includes a filter 40 and a voltage regulator 41. The filter 40, which is referred to as a gyrator by the inventor, presents a low DC resistance and a high AC impedance to the signals at the junction 36 formed by the connection of the positive port of the rectifier 28, a port of the hybrid circuit 29, and the signal path 37. Thus, the filter 40 prevents the audio frequency signals at the junction 36 from being attenuated by the load caused by the regulator circuit 41 and the second modem circuit 16. Thus, the filter 40 effectively simulates an inductive component by passing only the DC component at the junction 36 to the voltage regulator 41 via a line 42. The construction and operation of the filter 40 is described in U.S. Pat. No. 4,500,754 to Mackey, which is incorporated herein by reference.

Figure 2:
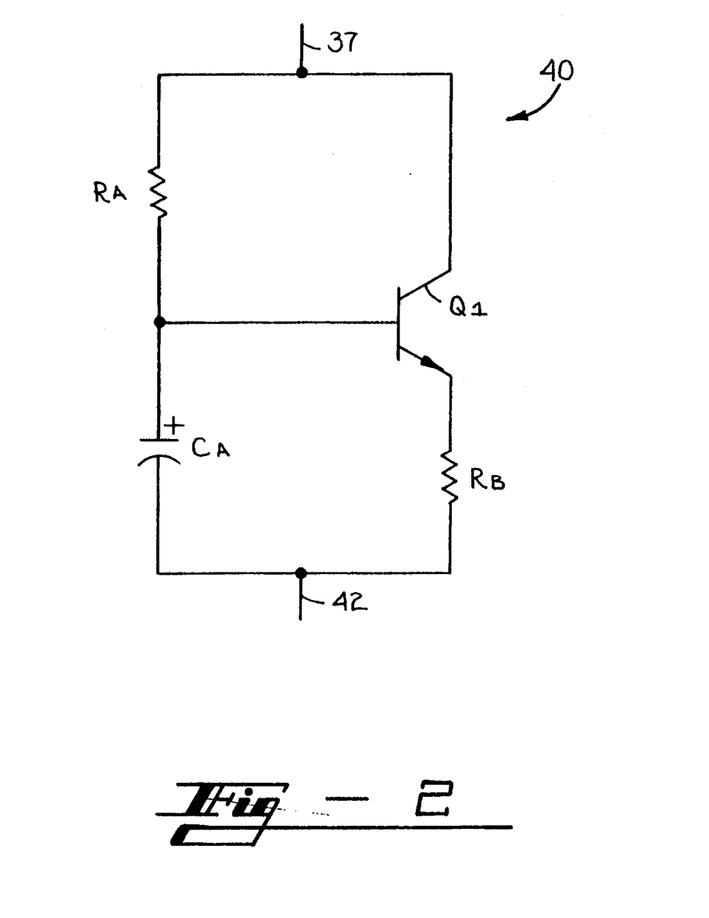
FIG. 2 is a schematic diagram of the preferred filter 40 of the present invention.

FIG. 2 shows a schematic diagram for the preferred construction of the filter 40. Referring now to FIGS. 1A, 1B and 2, a common terminal formed between the collector of a transistor $Q_1$ and a resistor $R_A$ is connected to the positive port of the full wave rectifier 28 via the signal path 37. Another common terminal forgaged by the junction of a capacitor $C_A$ and a resistor $R_B$ is connected to the input of the voltage regulator 41 via the line 42. The emitter of the transistor $Q_1$ is connected to the resistor $R_B$ and the base of the transistor $Q_1$ is connected to the junction of the resistor $R_A$ and the positive terminal of the capacitor $C_A$.

The resistor $R_A$ biases the base of the transistor $Q_1$ and the capacitor $C_A$ filters the audio frequency signals carried by the incoming analog telephone signal via the telephone line 11 and onto the signal path 37. In particular, the combination of the resistor $R_A$ and the capacitor $C_A$ operate as an RC filter to suppress the AC voltage presented between the base of the transistor $Q_1$ and the line 42 while allowing the base of the transistor $Q_1$ to receive a DC current bias through the resistor $R_A$. The resistor $R_B$, typically having a low resistive value, presents the approximate DC impedance of the filter 40. For the preferred embodiment, the value of the resistor $R_B$ is 61.9 ohms.

Upon the application of a voltage level supplied by the incoming analog telephone signal on the signal line 37, the capacitor $C_A$ begins to charge through the resistor $R_A$. When the voltage on the capacitor $C_A$ exceeds the normal base-to-emitter voltage drop for the transistor $Q_1$, the transistor $Q_1$ will enter the ON state and supply current to the signal line 42 via the resistor $R_B$. The voltage across the capacitor $C_A$ will reach a maximum voltage level when the voltage drop across the resistor $R_A$ is just sufficient to supply the base current required to maintain a predetermined operating point of the transistor $Q_1$. During operation at the predetermined operating point, the transistor $Q_1$ supplies a constant level of DC current through the resistor $R_B$ to the line 42.

Referring now to FIGS. 1A and 1B, the output of the filter 40, otherwise referred to as the first power output, contains only a DC signal component and is supplied to the input of the voltage regulator 41 via the line 42. The voltage regulator 41 operates to supply regulated power to the second modem circuit 16, specifically the CODEC 30, by regulating the first power output. The voltage regulator 41 comprises a zener diode 43 for clamping the output voltage of the filter 40 as the input to a switching voltage regulator 44 for supplying regulated power. The preferred switching voltage regulator is a model MAX 638 manufactured by Maxim, Sunnyvale, Calif.

The switching voltage regulator 44 supplies a regulated operating voltage $V_A$ to the second modem circuit 16. The regulated operating voltage $V_A$ is preferably a fixed +5 volts.

Figure 3:
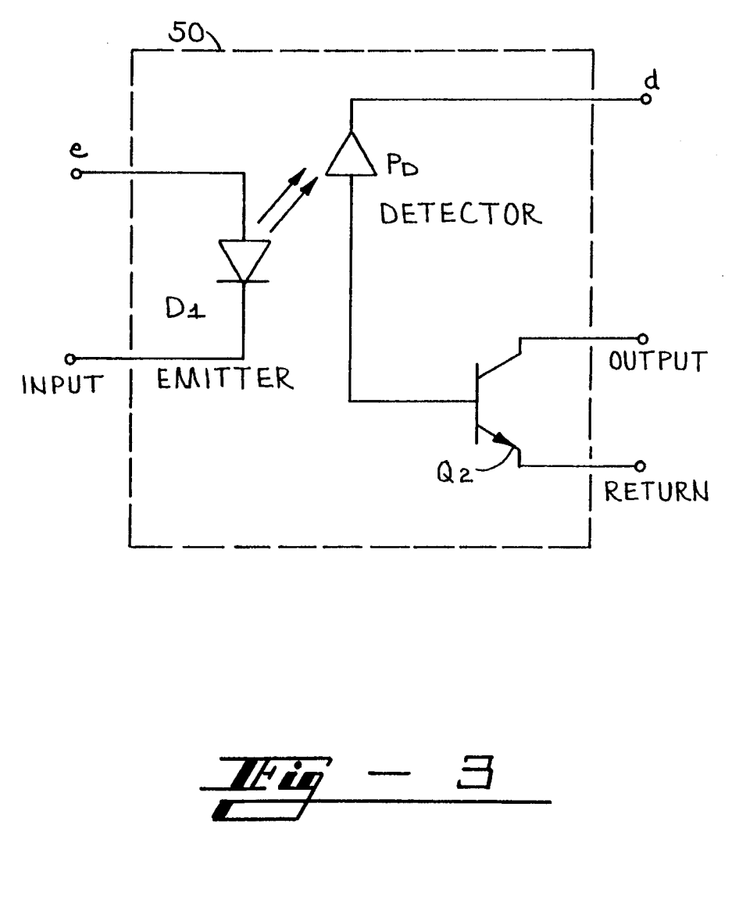
FIG. 3 is a schematic diagram of a typical electro-optical isolator device used by the present invention.

FIG. 3 shows a schematic diagram of a typical electro-optical isolator as used in the preferred embodiment. Referring now to FIGS. 1A, 1B and 3, the typical electro-optical isolator device 50 includes two physically separate sections, an emitter section having an LED $D_1$ and a detector section having a photo detector $P_D$ connected to the base terminal of a transistor $Q_2$. When the photo detector $P_D$ detects light energy emitted by the LED $D_1$, the transistor $Q_2$ enters the "ON" state. For example, if an emitter e and a detector d are connected to a positive power source, then the application of an input signal having a TTL low level to the input of the emitter section forces the LED $D_1$ to emit a light signal that is detected by the photo detector $P_D$. In response to the light signal, the photo detector $P_D$ biases the transistor $Q_2$ to the "ON" state to produce an output signal. If the emitter terminal of the transistor $Q_2$ is connected to circuit ground, then the signal at the collector terminal of the transistor $Q_2$ will correspond to the input signal at the input of the emitter section. If the collector terminal of the transistor $Q_2$ is connected to the positive power source, then the signal at the emitter terminal of the transistor $Q_2$ will be the inverse of the input signal to the detector section.

Each of the electro-optical isolator devices 32, 33, and 34 is connected to the operating voltage $V_S$ supplied by the first power source 21 and the operating voltage $V_A$ supplied by the second power source 22. For the first electro-optical isolator 32, the emitter e is powered by the operating voltage $V_A$ and the detector d is powered by the operating voltage $V_S$ and the first modem circuit return/ground 23. In contrast, for the second electro-optical isolator device 33 and the third electro-optical isolator device 34, the emitter e is powered by the operating voltage $V_S$ and the detector d is powered by the operating voltage $V_A$ and the second modem circuit return/ground 24. For the fourth electro-optical isolator device 35, the emitter e is powered by power drawn from the telephone line 11 and the detector d is powered by the operating voltage $V_S$ and the first modem circuit return/ground 23. Consequently, the operating voltage $V_A$ is only supplied to the second modem circuit 16, the operating voltage $V_S$ is only supplied to the first modem circuit 15, and the ground returns 23 and 24 are isolated from each other, thereby maintaining electrical isolation between the modem circuits 15 and 16.

In contrast to the electro-optical isolator devices 32, 33, 34, and 35, the off hook circuit 27 operates as a solid state relay device having an input LED, such as the emitter section shown in FIG. 3, and an output relay section including a single-pole, normally-open switch. Each side of a relay pole of the relay section is connected to an output. The emitter e is powered by the operating voltage $V_S$ and emits an internal control signal that closes the pole of the output relay in response to the control signal supplied by the controller 18. A signal path is formed between each output of the output relay when the relay operates in a closed state. Thus, electrical isolation is maintained between the modem circuits 15 and 16.

The combination of the second modem circuit 16, the isolation circuit 17 connected between the second modem circuit 16 and the first modem circuit 15, and the electrically distinct power sources 21 and 22 provides a data access arrangement circuit 60 for electrically isolating the telephone line 11 from a data device connected to the modem. Those persons skilled in the art will recognize that the data access arrangement circuit 60 provides a standard telephone line interface that can be used with any one of a plurality of digital modem circuits, such as the first modem circuit 15. For the preferred embodiment, the isolation circuit 17 isolates the digital circuitry of the first modem circuit 15 from the analog front end circuitry of the second modem circuit 16. Accordingly, modifications to, enhancements of, and different types of digital modem circuitry may be designed and connected to this standard telephone line interface without a need to recertify the electrical isolation characteristics of the modem.

Furthermore, the use of the separate power sources 21 and 22 supplies sufficient operating power capability to power more advanced communications methods than could be powered by a conventional power supply found in the traditional modem. The division of the modem functions between the two power sources 21 and 22, as shown in FIG. 1A and 1B, allows faster, more advanced, more power hungry communications methods to be performed by the modem 10 because the data transfer circuitry of the first modem circuit 15 can be powered by a conventional power supply and the telephone line interface circuitry of the second modem circuit 16 can be powered by the telephone line.

Although controller 18, transmitter 19, and receiver 20 have been shown as distinct components for clarity of explanation, it will be appreciated that these functions may be performed by a single microprocessor, if desired, with the functions representing different routines within the operating program for the microprocessor.

From the above description and drawings, many other embodiments of the present invention may suggest themselves to those skilled in the art. Therefore, the scope of the present invention is to be limited only by the claims below.

I claim:
1. A modem, comprising
   a modem circuit comprising a transmitter for providing an outgoing digital data signal and a receiver for receiving an incoming digital data signal;
   a coder/decoder (CODEC) coupled to a telephone line for providing said incoming digital data signal by encoding an incoming analog telephone signal received via said telephone line and for providing an outgoing analog telephone signal for transmission over said telephone line by decoding said outgoing digital data signal;
   a first power source, which does not draw power from said telephone line, for supplying all operating power to said modem circuit;
   a second power source functionally connected to said telephone line for supplying all operating power to said CODEC by drawing power only from said telephone line; and
   isolation means connected between said CODEC and said modem circuit for coupling said incoming digital data signal from said CODEC to said modem circuit, for coupling said outgoing digital data signal from said modem circuit to said CODEC, and for electrically isolating said CODEC from said modem circuit.

2. A modem as recited in claim 1, wherein said isolation means comprises a first electro-optical isolator device to couple said incoming digital data signal from said CODEC to said receiver, and a second electro-optical isolator device to couple said outgoing digital data signal from said transmitter to said CODEC.

3. A modem as recited in claim 2, wherein said first electro-optical isolator device has an emitter powered by said second power source and a detector powered by said first power source.

4. A modem as recited in claim 2, wherein said second electro-optical isolator device has an emitter powered by said first power source and a detector powered by said second power source.

5. A modem as recited in claim 1 wherein said modem circuit further comprises control means for controlling the operations of said CODEC by supplying control signals to said CODEC.

6. A modem as recited in claim 5, wherein said isolation means comprises a first electro-optical isolator device to couple said incoming digital data signal from said CODEC to said receiver, a second electro-optical isolator device to couple said outgoing digital data signal from said transmitter to said CODEC and a third electro-optical device to couple said control signals from said control means to said CODEC.

7. A modem as recited in claim 5 further comprising:
ring detection means connected to said telephone line for supplying a ring detection signal upon detecting a telephone ring event;
wherein said isolation means further couples said ring detection signal from said ring detection means to said control means and electrically isolates said ring detection means from said control means.

8. A modem as recited in claim 7, wherein said isolation means comprises a first electro-optical isolator device to couple said incoming digital data signal from said CODEC to said receiver, a second electro-optical isolator device to couple said outgoing digital data signal from said transmitter to said CODEC, a third electro-optical isolator device to couple said control signals from said control means to said CODEC, and a fourth electro-optical isolator device to couple said ring detection signal from said ring detection means to said control means.

9. A modem as recited in claim 8, wherein said first electro-optical isolator device has an emitter powered by said second power source and a detector powered by said first power source.

10. A modem as recited in claim 8, wherein each of said second electro-optical isolator device and said third electro-optical isolator device has an emitter powered by said first power source and a detector powered by said second power source.

11. A data access arrangement circuit for electrically isolating a telephone line from a modem circuit comprising a transmitter for providing an outgoing digital data signal and a receiver for receiving an incoming digital data signal, said modem circuit powered only by a first power source which does not draw power from said telephone line, said data access arrangement circuit comprising:
a CODEC coupled to said telephone line for providing said incoming digital data signal by encoding an incoming analog telephone signal received from said telephone line and for providing an outgoing analog telephone signal for transmission over said telephone line by decoding said outgoing digital data signal;
a second power source for supplying all operating power to said CODEC by drawing power only from said telephone line; and
isolation means connected between said CODEC and said modem circuit for coupling said incoming digital data signal from said CODEC to said receiver, for coupling said outgoing digital data signal from said transmitter to said CODEC and for electrically isolating said CODEC from said modem circuit.

12. A data access arrangement circuit as recited in claim 11, wherein said isolation means comprises a first electro-optical isolator device to couple said incoming digital data signal from said CODEC to said receiver, and a second electro-optical isolator device to couple said outgoing digital data signal from said transmitter to said CODEC.

13. A data access arrangement circuit as recited in claim 12, wherein said first electro-optical isolator device has an emitter powered by said second power source and a detector powered by said first power source.

14. A data access arrangement circuit as recited in claim 12, wherein said second electro-optical isolator device has an emitter powered by said first power source and a detector powered by said second power source.

15. A data access arrangement circuit as recited in claim 11 wherein said modem circuit further comprises control means for supplying control signals and said CODEC is responsive to said control signals.

16. A data access arrangement circuit as recited in claim 15, wherein said isolation means comprises a first electro-optical isolator device to couple said incoming digital data signal from said CODEC to said receiver, a second electro-optical isolator device to couple said outgoing digital data signal front said transmitter to said CODEC, and a third electro-optical isolator device to couple said control signals from said control means to said CODEC.

17. A data access arrangement circuit as recited in claim 15 further comprising:
ring detection means connected to said telephone line for supplying a ring detection signal upon detecting a telephone ring event;
wherein said isolation means further couples said ring detection signal from said ring detection means to said control means and electrically isolates said ring detection means from said control means.

18. A data access arrangement circuit as recited in claim 15, wherein said isolation means comprises a first electro-optical isolator device to couple said incoming digital data signal from said CODEC to said receiver, a second electro-optical isolator device to couple said outgoing digital data signal from said transmitter to said CODEC, a third electro-optical isolator device to couple said control signals from said control means to said CODEC, and a fourth electro-optical isolator device to couple said ring detection signal from said ring detection means to said controller.

19. A data access arrangement circuit as recited in claim 18, wherein said first electro-optical isolator device has an emitter powered by said second power source and a detector powered by said first power source.

20. A data access arrangement circuit as recited in claim 19, wherein each of said second electro-optical isolator device and said third electro-optical isolator device has an emitter powered by said first power source and a detector powered by said second power source.

21. A modem circuit for use with a coder/decoder (CODEC), said CODEC being coupled to a telephone line for providing an incoming digital data signal by encoding an incoming analog telephone signal received via said telephone line and for providing an outgoing analog telephone signal for transmission over said telephone line by decoding an outgoing digital data signal, and drawing all operating power from said telephone line, said modem circuit comprising:
a transmitter for providing said outgoing digital data signal to said CODEC;
a receiver for receiving said incoming digital data signal from said CODEC;
control means for controlling the operations of said CODEC by supplying control signals to said CODEC;
a power source, which does not draw power from said telephone line, for supplying all operating power to said transmitter, said receiver, and said control means; and isolation means, connected between said CODEC and said transmitter, said receiver, and said control means, for coupling said incoming digital data signal from said CODEC to said receiver, for coupling said outgoing digital data signal from said transmitter to said CODEC, for coupling said control signals from said control means to said CODEC, and for electrically isolating said CODEC from said transmitter, said receiver, and said control means.

* * * * *